United States Patent [19]
Chambers et al.

[11] Patent Number: 4,910,493
[45] Date of Patent: Mar. 20, 1990

[54] SECURITY SYSTEMS

[75] Inventors: Christopher G. Chambers, Bythorn; Malcolm A. Pye, Chrishall, both of United Kingdom

[73] Assignee: Automated Security (Holdings) PCL, London, England

[21] Appl. No.: 279,954

[22] Filed: Dec. 5, 1988

[30] Foreign Application Priority Data

Jul. 11, 1988 [GB] United Kingdom ................. 8816449

[51] Int. Cl.⁴ .............................................. G08B 1/08
[52] U.S. Cl. .................................. 340/426; 180/287; 307/10.2; 340/539; 342/457
[58] Field of Search ...................... 340/63, 64, 988–992, 340/996, 539, 540, 425.5, 426, 993; 342/457; 180/287; 307/10.2

[56] References Cited
U.S. PATENT DOCUMENTS

| | | | |
|---|---|---|---|
| 3,665,312 | 5/1972 | Jarvis | 340/989 |
| 4,110,738 | 8/1978 | Saltin | 340/539 |
| 4,150,731 | 4/1979 | Tannenbaum | 340/63 |
| 4,177,466 | 12/1979 | Reagan | 340/63 |
| 4,187,497 | 2/1980 | Howell et al. | 340/539 |
| 4,259,664 | 3/1981 | Boisclair | 340/63 |
| 4,354,275 | 10/1982 | Bouyssounouse et al. | 340/539 |
| 4,482,785 | 11/1984 | Finnegan et al. | 340/539 |
| 4,651,157 | 3/1987 | Gray et al. | 340/63 |
| 4,691,801 | 9/1987 | Mann et al. | 340/63 |
| 4,713,661 | 12/1987 | Boone et al. | 340/994 |
| 4,713,808 | 12/1987 | Gaskill et al. | 370/94 |
| 4,809,316 | 2/1989 | Namekawa | 340/539 |

FOREIGN PATENT DOCUMENTS

| | | |
|---|---|---|
| 125930 | 5/1984 | European Pat. Off. |
| 279054 | 12/1987 | European Pat. Off. |
| WO88/05213 | 7/1988 | PCT Int'l Appl. |
| WO88/05214 | 7/1988 | PCT Int'l Appl. |
| 1469509 | 4/1977 | United Kingdom |
| 1581224 | 12/1980 | United Kingdom |
| 2191365A | 12/1987 | United Kingdom |
| 2201266A | 8/1988 | United Kingdom |

Primary Examiner—Joseph A. Orsino
Assistant Examiner—Brent A. Swarthout
Attorney, Agent, or Firm—Weingarten, Schurgin, Gagnebin & Hayes

[57] ABSTRACT

A vehicle security system can be fitted to a vehicle which has a radio transmitting device such as a cellular telephone, PMR or CB set. A control unit is arranged to periodically alert the driver of the vehicle to record a location message. When an alarm condition is signalled to the control unit from an alarm system, a panic button or a ratio receiver co-operable with a remote panic button transmitter, the control unit initiates a transmission from the radio transmitting device. The message transmitted includes the last recorded location message and may also include vehicle identification information and a mileage update message generated in response to the output of a vehicle odometer to indicate the distance travelled by the vehicle since the last location message was recorded by the driver. The same security system may also be constructed as a portable unit.

16 Claims, 2 Drawing Sheets

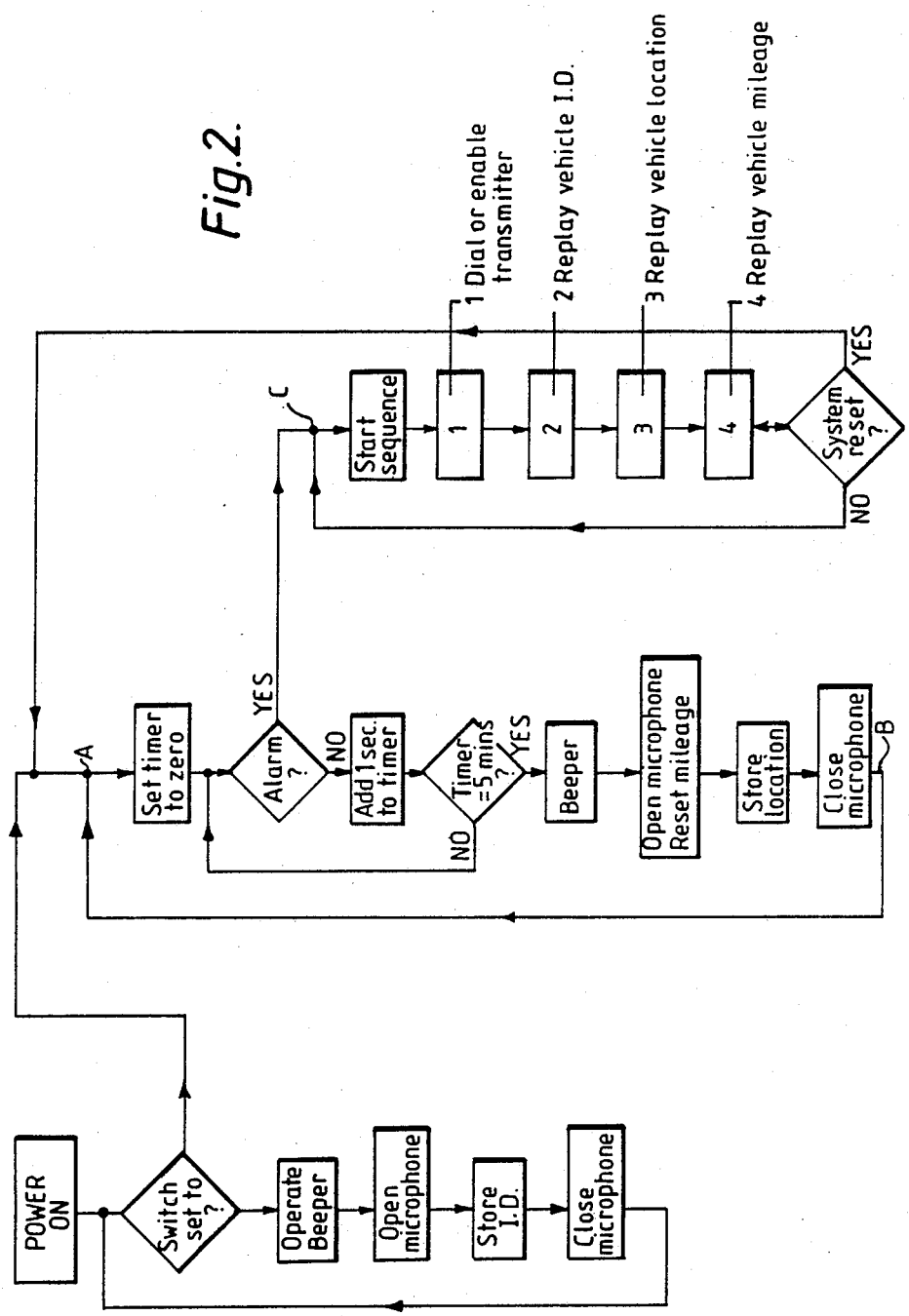

SECURITY SYSTEMS

BACKGROUND OF THE INVENTION

1. Technical Field

The present invention relates to security systems and, more particularly, to systems for allowing an alarm message to be conveyed from a vehicle which is under threat of, for example, a hijack attack. The vehicle to be protected may be of any type such as a heavy goods vehicle carrying a commercial load of value, or a motor car carrying important passengers, cash or valuable goods. The system of the invention may also be modified to provide a portable security unit.

2. Prior Art

There are security systems available which incorporate anti-hijack features. In some proposed systems the driver is able to activate an audible warning, such as a siren or a horn and/or immobilize the vehicle. Since the operation of such a system is obvious to the attacker, it may cause a violent reaction and this may increase the danger to the driver and/or passengers. There also exist various automatic vehicle location systems which, by means of radio signals, allow a central station to monitor the position of a vehicle continuously. These systems can also incorporate a device which is intended to be operated by the driver when attacked in order to send a coded radio message to the central station. In this way the central station knows exactly where a vehicle under attack is located. Unfortunately such automatic vehicle location systems are extremely complex and expensive. Such technology is therefore not appropriate to small commercial vehicle users, particularly if they only own a small fleet.

It is now becoming increasingly common for vehicles to be fitted with radio transmitting devices. Such devices include cellular radio telephones, Citizen's Band (CB) radio, and Private Mobile Radio (PMR) sets. Because of the nature of a cellular telephone system, the location of any telephone to within a single cell can be identified by the network operator. However, a cell can be relatively large so that unless the driver of a vehicle under attack is able to give his precise location when making an emergency call, there is still a problem of locating the vehicle. Moreover, it is not possible to make a telephone call covertly so that using a cellular telephone may give rise to an increased danger of personal attack from the hijacker.

In PMR systems, all mobile radios in a fleet are connected to at least one common base station. Some available equipment includes a device for making an automatic emergency call to this base station. Although the base station will then be aware that a vehicle is under attack, it has no way of establishing the location of that vehicle unless the driver is able to speak to the base station to give his location. Once again, this may give rise to an increased risk of personal attack from the hijacker.

Another requirement for providing for the security of a vehicle load arises in relation to refrigerated vehicles. The breakdown of the refrigeration system in transit can incur considerable financial penalties to the vehicle operator. Such a breakdown may not be noted by the driver himself. It is also unlikely that he would be able to take any remedial action to repair the refrigeration system without outside assistance.

SUMMARY OF THE INVENTION

From the above it will be appreciated that there is a significant technical problem of providing for a vehicle security system that is accessible to small fleet operators and allows an alarm to be given to a remote third party which includes an indication of the vehicle location without, in the case of systems for providing security against hijacking, alerting the hijacker.

Similar technical problems also arise in the provision of portable security units for personnel in risk situations such as patrol guards and lone workers in hazardous areas.

Accordingly, the present invention provides a security system for use in a vehicle or a portable unit having a radio transmitting device, said system comprising signalling means for generating a signal in response to an alarm condition, a control unit connected to said signalling means for initiating a transmission on the radio transmitting device in response to said alarm condition, and means for recording a location message, said control unit being operative to produce an alert signal periodically in order to prompt recording a fresh location message using said recording means, said location message forming at least part of the transmission in response to an alarm condition.

With such a system installed in a vehicle the driver is periodically prompted to record a location message which can form the substance of an automatic call. The call is made to the base station when the radio transmitting device is a PMR device, or to an emergency number when the radio device is a cellular telephone, or is a broadcast message when the radio device is CB. Since many vehicles already carry a radio transmitting device of one of these types, it is possible to modify such a vehicle simply and economically in order to provide it with a vehicle security system in accordance with the invention.

Preferably the system further comprises a storage means in which vehicle identification information is stored. This may include the registration plate number and other details which would be needed to provide the emergency services with sufficient information to recognize the vehicle. When such a memory is provided the information transmitted during the automatic call will comprise the contents of said memory followed by the last message stored in the recording means.

The system may further comprise a message generator operatively connected to an odometer of the vehicle in order to generate a further part of the transmission in response to an alarm condition representing the distance travelled by the vehicle since the last alert signal was produced. The use of such a message generator gives the advantage that the driver need be prompted less often in order for the location information provided if an emergency arises to be sufficiently accurate for the vehicle to be located promptly.

The signalling means may include a manually operable ,panic, button located near the driver so that it can be actuated covertly. The signalling means may also include a radio receiver which is co-operable with a hand held, short range transmitter that can be used by a driver to actuate the system from outside his vehicle. This allows the security system to be effective when the vehicle is left parked. With such an embodiment the control unit will inhibit the prompt function in response to an input signal indicating that the ignition has been turned off and/or the vehicle locked.

A further signalling means could include an impact switch which senses when the vehicle is subject to mechanical shock indicative of an accident, a collision or of being deliberately rammed.

Where the system is intended to provide security against refrigeration system breakdown, the signalling means is a temperature monitor located within the refrigerated body of the vehicle and which is adapted to produce a signal in response to variation of the temperature outside a predetermined acceptable range. In this way a base station may be alerted to the requirement for immediate maintenance of the vehicle or transfer of the load and arrangements can readily be made to intercept the vehicle during its journey before irreparable damage has been caused to the load.

BRIEF DESCRIPTION OF THE DRAWINGS

A security system embodying the invention will now be described, by way of example only, with reference to the accompanying diagrammatic drawings, in which:

FIG. 2 is a flow diagram illustrating the program employed in the control unit of the system FIG. 1.

DESCRIPTION OF PREFERRED EMBODIMENTS

Figure 1:
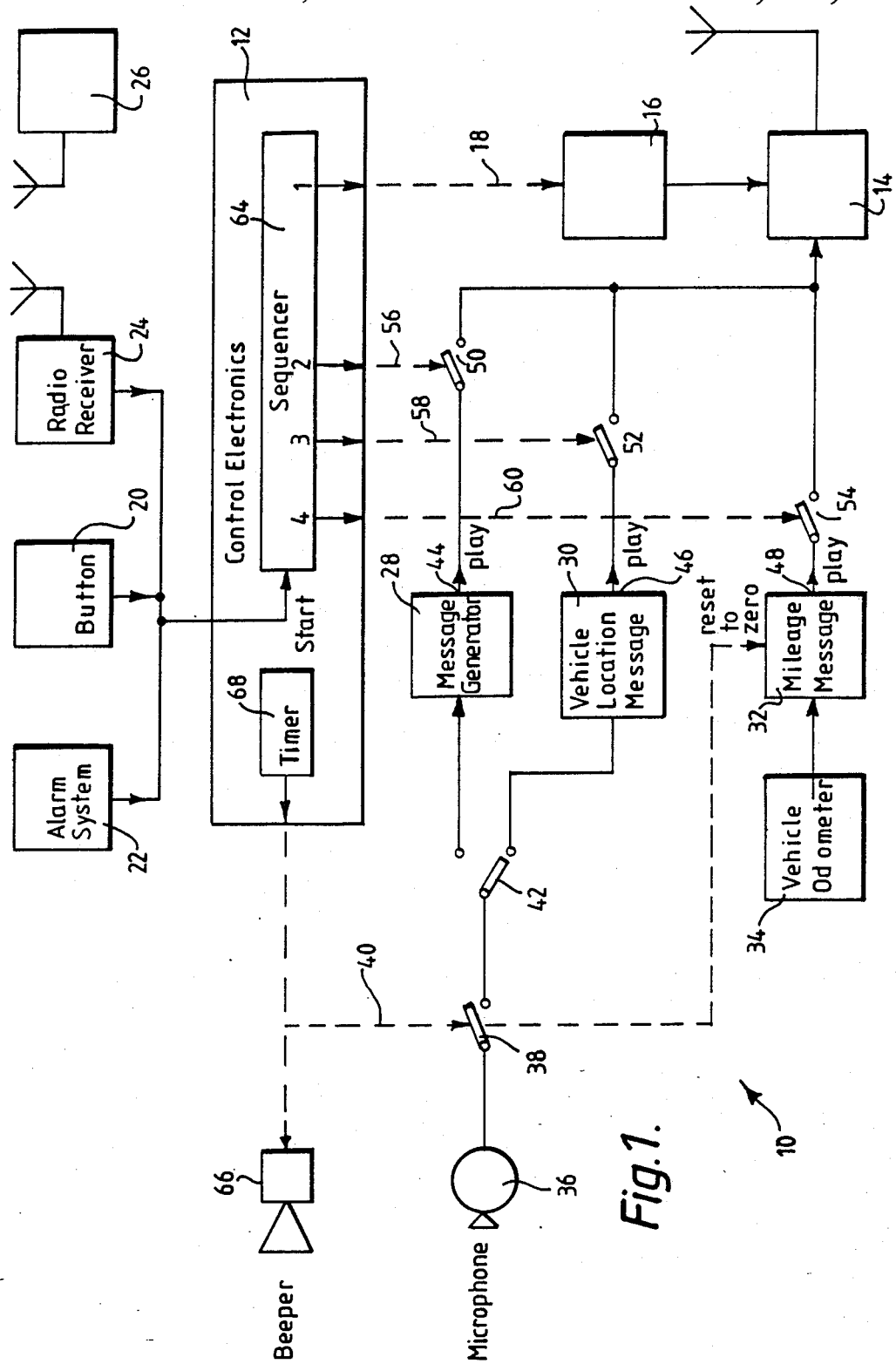
FIG. 1 is a block diagram of the system.

The system will be described initially in relation to its application to a vehicle but it will be appreciated that the same system may be constructed as a portable unit with minor modifications.

A security system 10 for a vehicle includes a control unit 12 which is connected to a radio transmitting device 14, which is typically already installed in the vehicle. In the illustrated embodiment the radio transmitting device is a cellular telephone. It is interfaced to the control unit by means of an autodialler 16 programmed to dial a predetermined emergency telephone number upon actuation by the control unit by means of a control signal on control line 18.

The control unit 12 is connected to various devices which may be referred to as signalling means as they are capable of signalling to the control unit that an alarm condition is present. The signalling means shown include a panic button 20 which is conveniently placed near the driver so that it can be covertly pressed if a hijack attack is imminent. The control unit may also receive an input from a vehicle alarm system 22 which can be connected to sensors on the doors of the vehicle. This alarm system may be any type of intruder detection system for a vehicle. Such systems are typically connected to the vehicle horn or lights to produce an audible or visible alarm when the vehicle is broken into. In the case of a refrigerated vehicle the alarm system 22 may be an electronic sensor that monitors the temperature within the refrigerated body of the vehicle. Such a sensor will be provided with control electronics in order to generate an output alarm signal only when the temperature falls outside a predetermined range. It will usually only be necessary to define the upper limit of the range so that an alarm signal is produced when the temperature exceeds a safe value. Intruder alarm systems and temperature alarm systems may, of course, be provided on the same vehicle. The third signalling means illustrated is the output of a radio receiver 24 which is tuned to the same frequency as a short range, hand held transmitter 26 which acts as a remote panic button which the driver of the vehicle can take with him on leaving the vehicle. Therefore if the driver sees an attack being carried out on his vehicle when, say, he is in a transport cafe he is able to actuate the security system of his vehicle by activating the radio transmitter 26.

The system also includes three components for generating the message which is to be transmitted in response to an emergency. These three components are a storage means 28 which stores vehicle identification data, recording means 30 which is used to record and re-record a location message, and a mileage message generator 32 which receives an input from an odometer 34 of the vehicle to which the system is fitted. All of these message generators 28, 30 and 32 may be solid state devices utilizing a single chip CMOS LSI device with a supporting EPROM or ROM. Such voice processors are known and, for example a suitable device is manufactured by UMC under the description UM5100 voice processor IC. It would also be possible to use a ruggedized tape recorder as any or each of these message generators. The generators 28 and 30 must be capable of recording messages from a voice input and for this reason their 'record' inputs are connected to a microphone 36 which is fitted into the vehicle at a convenient position for recording the driver's voice. The microphone 36 is preferably voice actuated. This enables the recording of messages to be carried in a "hands-free" mode. The microphone 6 is connected to the 'record' inputs of the generators 28 and 0 by means of a first switch 38 which is opened and closed by a control signal on line 40 from the control unit 12, and a second switch 42 connected in series with the first switch 38. The switch 42 has two positions: a "program" position where it connects the microphone to the vehicle identification message generator 28, and a "normal" position in which it connects the microphone to the 'record' input of the location message generator 30. The switch 42 is mounted on a control panel so that it can be operated by the driver. In the "program" position he is able to record vehicle identification information in the generator 28. This will normally be done at the start of a trip if the data is to include information about the load being carried. If such updating is not required then the provision of a record facility in this message generator 28 need not be provided. In this case the generator will contain pre-recorded information which relates to the vehicle in which the system is installed. The required information can be pre-recorded by the system provider.

The mileage message generator 32 contains or is programmed to synthesize a number of stored messages of the type "plus two miles", "plus three miles", etc. An appropriate message is synthesized or reproduced in response to the odometer input when the control unit provides a control signal requesting a 'play' output. The particular message made available for output at any time depends upon the mileage travelled by the vehicle as sensed by the odometer since the generator 32 was last reset by means of a control signal received on control line 40 from the control unit 12. This reset signal is received each time a new location message is stored in the message generator 30. Where the complexity and cost of synthesized speech messages in response to an odometer input are deemed to be unwarranted, the mileage message generator 32 may simply comprise an audio tone oscillator which causes an audible 'bleep' to be stored for every half mile or mile run since it was last reset when the last location message was stored in the message generator 30.

'Play' outputs 44, 46, 48 from each message generator are connected by respective switches 50, 52, 54 to an input of the radio transmitting device 14. The switches 50, 52, 54 are each controlled by a control signal on a respective control line 56, 58,60 from a sequencer 64 within the control unit 12. The message generators are arranged so that when the associated switch is closed the generator plays the stored message or, in the case of mileage message generator 32, the appropriate message, from its beginning. In this way a composite message commencing with the vehicle identification information, followed by the last driver-recorded location message and concluding with the mileage update message, is transmitted from the radio transmitting device 14.

The control line 40 is also connected to a beeper 66 which is mounted in the vehicle near the driver in order to provide an audible warning that a fresh location message must be recorded by the driver. A flashing light or other alerting device may be used instead. The intervals at which an 'alert' control signal is sent out on control line 40 to actuate the beeper 66, close the switch 38 enabling the recording of a fresh location message, and reset the mileage message generator 32, depends upon the operating conditions of the vehicle and is set by means of a timer 68 in the control unit 12.

The interval set by the timer 68 may be varied dynamically in response to the vehicle speed. In such a case an output signal from odometer 34 would be connected to the control unit 12. In this way the driver would have to record his location more frequently when travelling at higher speeds. In this way the distance resolution of the system may be maintained substantially constant.

The time interval set by the timer 68 may alternatively be settable by means of an input from a control panel (not shown) so that it may be changed by the fleet operator but preferably not the driver. This could be arranged by providing the control panel underneath a lockable door. The control panel can also include the switch 42 and a reset switch for terminating a call or broadcast made in response to an alarm.

Since in many cases the radio transmitting device 14 is also capable of receiving calls, the system may also provide a facility whereby receipt of a coded message causes the control unit 12 to override the timer 68 and immediately output an alert, signal in order to have the driver record a fresh location message. Coded signals could also be used to cause the system to generate an automatic call when there is no alarm condition in order to test the system and/or provide useful fleet management information. Other functions of the system could also be controlled remotely in the same way.

The operation of the described system is controlled by a program running on a microprocessor in the control unit 12. The function of this program is illustrated by the flow diagram shown in FIG. 2. It will be appreciated that the functions of the timer 68 and the sequencer 64 may be provided within the microprocessor itself or be provided by separate electronic circuits. Similarly the whole of the function of the control unit 12 may be produced by dedicated electronic circuitry.

The flow diagram will now be briefly described to illustrate the operation of the system.

On powering up the system the switch 42 is first interrogated to determine whether the system has been set into the "normal" or "program" mode. If in the "program" mode the control unit follows a sequence of operations which allows the user to record the vehicle identification message to be stored in the message generator 28. In this sequence the beeper 66 is first briefly operated to warn the user that he should start to record the message, the switch 38 to connect the microphone 36 to the 'record' input of the message generator 28 is then closed for a time interval which is primarily controlled by the "Press-to-talk" switch of microphone 36 or by the control electronics if the microphone 36 is voice actuated but ultimately depends upon the length of the message which can be stored.

When switch 42 is in the "normal" mode the control unit operates so as to provide continuous security monitoring for any alarm signalling inputs from the panic button 20, alarm system 22 or radio receiver 24, which receives alarm signals generated by the hand-held unit 26. In this monitoring function the control unit program runs continuously round the loop of operations identified between the points A and B in the flow diagram. At the start of this loop the timer 68 is set to zero and begins to measure elapsed time up to a preset interval which, in the illustrated example, is set at 5 minutes, although a much longer interval would be appropriate where the vehicle is travelling a known route or the security risk is lower. The alarm inputs are repeatedly interrogated during this time period and if an alarm condition is detected the flow of the control unit program diverts to the point C in order to make an automatic call or broadcast on the radio transmitting device 14.

If no alarm condition is detected, when the timer has reached its preset maximum elapsed time, the control unit operates the beeper 66 to warn the driver that he must record another location message. The switch 38 is closed to connect the microphone to the location message generator 30 for a time interval dependent upon the length of message to be stored. The switch 38 is then opened again and the flow of the program returns to point A and the timer is reset once again to zero. A further audible warning may be produced by the beeper 66 at, or shortly before, the expiry of the message storage time both during this recording operation and during the operation in "program" mode to store vehicle identification information. This warns the user to complete his message.

Whenever an alarm signal is input to the control unit 12 from one of the signalling means 20, 22, 24, the program diverts to point C and the sequencer 64 is started. The sequencer produces a control signal first on line 18 to the autodialler 16 to cause a cellular telephone to make a call to a preset emergency telephone number. If the radio transmitting device 14 is a CB device then the signal on control line 18 merely switches on such a device so that it starts to transmit. If the device is a PMR, for example, a Band III radio, the sequencer 64 is preprogrammed to take account of the "call establishment time" (CET) and delays the transmission of any messages until the radio link is established.

Once the necessary steps have been taken to ensure that transmission is possible, the sequencer 64 generates the control signals on control line 56, 58 and 60 in turn to close and then allow to re-open the switches 50, 52 and 54 in turn thereby generating a message in which the vehicle identification information is replayed followed by the last-recorded location message and then the mileage update message from the message generator 32. Therefore the duration of each control signal to maintain the associated switch 50, 52 or 54 closed depends on the length of the message stored in the appropriate message generator. If the system has not been reset which may be done by a further switch accessible to the driver, or which may be automatic after a predetermined time in the case of the use of a cellular telephone where prolonged transmissions would be expensive, the program loops back to point C and restarts the message. This is particularly appropriate where CB is being used and there can be no guarantee that the first transmission of the message will be heard by a responsible party. When the system is reset the security system program returns to point A in the flow diagram.

In a modified system additional memory elements may be incorporated in the message generator 28 so that a number of different warning messages can be prerecorded and selected according to the nature of the alarm signalling input that triggers the system. The alarm systems 22 used in conjunction with the described system can incorporate sensors to monitor a wide range of vehicle functions appropriate to its operating requirements and procedures. Thus, a different message is ideally required when the temperature of a refrigerated vehicle has risen above an acceptable level from that required when the system is under a physical attack. Similarly, a different message may be required if the vehicle is involved in an accident. The appropriate stored message can be read out under control of the control electronics 12.

It will be appreciated that the described system may be retrofitted to a vehicle which already has a radio transmitting device 14 installed. In the case of a PMR radio which has the facility for a panic button to generate an emergency call to the base station, this facility may be operated by the control line 18 from the control unit 12 and the message normally generated by the PMR device substituted by the message generated by the described system.

It will also be appreciated that an effective system can be provided without the need for some of the facilities, such as the mileage message generator 32 described, and still provide an effective and economical security system to counter the hijack risk.

The system of the present invention is also not restricted to use in a vehicle. For example, patrol guards may be provided with hand portable radios so that they may communicate with a gate house or security office while on patrol. If surprised by intruders, the guard may not have time to report his position. The problem that the guard may be subject to increased violence if he attempts to summon help is also applicable to this application of the system. Accordingly, the patrol guard may be provided with a portable security system of the type already described. Such a system can readily be made compact enough to be carried on a belt or in a uniform pocket so that it can be used to summon assistance automatically and report the guard's position. Such a portable system would use a "panic button" as a signalling means. Another signalling means may be provided by non-response to the periodical alert signal requiring recording of a fresh location message. The radio transmitting device need only be the normal low-powered radio that is usually available to such patrol guards. Other similar applications will be apparent to those skilled in the art of security procedures for lone worker safety systems. Another type of signalling means which may be incorporated into such personal security systems is an orientation sensor which detects that the user has remained in a prone position for a predetermined period of time. Being in such a position usually indicates that the user has been floored by a physical assault or a medical problem engendered by the hazardous environment.

We claim:

1. A security system for use in a vehicle or a portable unit having a radio transmitting device, said system comprising:
   signalling means for generating a signal in response to an alarm condition,
   a control unit connected to said signalling means for initiating a transmission on the radio transmitting device in response to said alarm condition, and
   means for recording an operator voice generated vehicle, portable unit location message,
   wherein said control unit produces an alert signal periodically in order to prompt voice recording of a fresh location message using said recording means, said location message forming at least part of the transmission, in response to an alarm condition.

2. A security system according to claim 1, wherein the signalling means comprises an output from a manually operable panic button.

3. A security system as claimed in claim 1, further comprising storage means in which vehicle identification information is stored and which is accessed by said control unit such that the stored information forms a further part of the transmission in response to an alarm condition.

4. A security system as claimed in claim 1, further comprising a message generator operatively connected to an odometer of the vehicle in order to generate a further part of the transmission in response to an alarm condition representing the distance travelled by the vehicle since the last alert signal was produced.

5. A security system as claimed in claim 1, further comprising means for inhibiting the production of alert signals in response to an input signal indicating that the ignition has been turned off.

6. A security system as claimed in claim 1 in the form of a portable unit comprising a radio transmitter, wherein the signalling means is responsive to an alarm condition output from the location message recording means indicating that a location message has not been recorded in response to an alert signal within a predetermined time.

7. A security system as claimed in claim 1, wherein the radio transmitting device receives coded control signals from a remote location which control signals are fed to the control unit to control a function of the unit.

8. A security system as claimed in claim 1, further comprising storage means for storing a plurality of different messages, said control unit being operatively connected to said storage means to select a particular message for transmission in response to an alarm condition in dependence on which of a plurality of said signalling means detected the alarm condition.

9. A security system according to claim 1, wherein the signalling means comprising an output from a temperature sensor carried in the body of a refrigerated vehicle.

10. A security system according to claim 1, wherein the signalling means comprises an output from an impact switch.

11. A security system according to claim 1, wherein the signalling means comprises an output from the location message recording means when a message has not been recorded in response to an alert signal within a predetermined time.

12. A security system according to claim 1, wherein the signalling means comprises an output from a vehicle alarm system responsive to intrusion or attempted intrusion.

13. A security system according to claim 1, wherein the signalling means comprises an output from a radio receiver co-operable with a hand held, short range transmitter.

14. A security system as claimed in claim 1 in the form of a portable unit comprising a radio transmitter, wherein the signalling means is a panic button fitted to said unit.

15. A security system as claimed in claim 1 in the form of a portable unit comprising a radio transmitter, wherein the signalling means is an orientation sensor.

16. A security system as claimed in claim 1, further comprising means for inhibiting the production of alert signals in response to an input signal indicating that the vehicle is locked.

* * * * *

UNITED STATES PATENT AND TRADEMARK OFFICE
CERTIFICATE OF CORRECTION

PATENT NO. : 4,910,493

DATED : March 20, 1990

INVENTOR(S) : Christopher G. Chambers and Malcolm A. Pye

It is certified that error appears in the above-identified patent and that said Letters Patent is hereby corrected as shown below:

On the title page:
In the Abstract, line 7, "ratio" should read --radio--.

In Column 2, line 62, "ble, panic, buttom" should read --ble panic button--.

In Column 4, line 29, "microphone 6" should read --microphone 36--.

In Column 4, line 31, "28 and 0" should read --28 and 30--.

In Column 4, line 33, "switch 38.10" should read --switch 38--.

In Column 5, line 48, "an alert, signal" should read --an alert signal--.

In Column 8, line 16, "vehicle, portable" should read --vehicle, or portable--.

UNITED STATES PATENT AND TRADEMARK OFFICE
CERTIFICATE OF CORRECTION

PATENT NO. : 4,910,493

DATED : March 20, 1990

INVENTOR(S) : Christopher G. Chambers and Malcolm A. Pye

It is certified that error appears in the above-identified patent and that said Letters Patent is hereby corrected as shown below:

In Column 8, line 21, "transmission, in" should read
--transmission in--.

Signed and Sealed this

Fifth Day of May, 1992

Attest:

DOUGLAS B. COMER

Attesting Officer

Acting Commissioner of Patents and Trademarks